(12) United States Patent
Kurth et al.

(10) Patent No.: US 10,302,157 B2
(45) Date of Patent: May 28, 2019

(54) CENTRIFUGAL CLUTCH

(71) Applicant: Schaeffler Technologies AG & Co. KG, Herzogenaurach (DE)

(72) Inventors: Franz Kurth, Nürnberg (DE); Ralph Schimpf, Fürth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 2 days.

(21) Appl. No.: 15/544,681

(22) PCT Filed: Jan. 20, 2016

(86) PCT No.: PCT/DE2016/200025
§ 371 (c)(1),
(2) Date: Jul. 19, 2017

(87) PCT Pub. No.: WO2016/119786
PCT Pub. Date: Aug. 4, 2016

(65) Prior Publication Data
US 2018/0266504 A1    Sep. 20, 2018

(30) Foreign Application Priority Data
Jan. 30, 2015    (DE) .................. 10 2015 201 591

(51) Int. Cl.
*F16D 45/00* (2006.01)
*F16D 47/04* (2006.01)
(Continued)

(52) U.S. Cl.
CPC ............. *F16D 45/00* (2013.01); *F16D 15/00* (2013.01); *F16D 41/063* (2013.01); *F16D 43/18* (2013.01);
(Continued)

(58) Field of Classification Search
USPC ........................................... 192/89.1
See application file for complete search history.

(56) References Cited

U.S. PATENT DOCUMENTS

| 3,202,250 A * | 8/1965 | Fulton .................. F16D 41/063 |
| | | 192/45.1 |
| 6,757,975 B1 * | 7/2004 | Todd ..................... B21D 53/28 |
| | | 192/105 CD |

(Continued)

FOREIGN PATENT DOCUMENTS

| DE | 102008030657 A1 | 1/2010 |
| DE | 102013213183 A1 | 9/2014 |

(Continued)

*Primary Examiner* — Mark A Manley
(74) *Attorney, Agent, or Firm* — Kevin L. Parks

(57) ABSTRACT

A centrifugal clutch is disclosed. The clutch may include an inner rotating element whose outer periphery includes a plurality of ramps and at least one centrifugal weight device surrounding the inner rotating element, which includes a plurality of peripherally distributed centrifugal weights and whose inner periphery includes a plurality of counter ramps for forming a positive frictional engagement with the ramps of the inner rotating element. It may further include an outer rotating element surrounding the at least one centrifugal weight device, wherein the centrifugal weights can be pressed outwards through a friction lining against an inner periphery of the outer rotating element in opposition to the action of a spring arrangement. The centrifugal weight device may be generally formed by an annular plate structure including at least one plate element, wherein the plate structure includes a plurality of peripherally distributed peripheral sections that form the centrifugal weights.

14 Claims, 2 Drawing Sheets

(51) Int. Cl.
*F16D 15/00* (2006.01)
*F16D 41/063* (2006.01)
*F16D 43/18* (2006.01)
*F16D 41/06* (2006.01)

(52) U.S. Cl.
CPC ...... *F16D 47/04* (2013.01); *F16D 2041/0605* (2013.01)

(56) References Cited

U.S. PATENT DOCUMENTS

| | | | |
|---|---|---|---|
| 6,865,763 B2 * | 3/2005 | Sears | D06F 37/40 192/105 BA |
| 2009/0159390 A1 * | 6/2009 | Davis | F16D 41/063 192/45.1 |
| 2014/0014455 A1 * | 1/2014 | Davis | F16D 15/00 192/45.1 |
| 2015/0027840 A1 | 1/2015 | Lee et al. | |

FOREIGN PATENT DOCUMENTS

| | | |
|---|---|---|
| EP | 1544435 A1 | 6/2005 |
| WO | 11023157 A1 | 3/2011 |

* cited by examiner

CENTRIFUGAL CLUTCH

CROSS-REFERENCE TO RELATED APPLICATIONS

This application is the U.S. National Phase of PCT Appln. No. PCT/DE2016/200025 filed Jan. 20, 2016, which claims priority to DE 102015201591.2 filed Jan. 30, 2015, the entire disclosures of which are incorporated by reference herein.

TECHNICAL FIELD

The disclosure relates to a centrifugal clutch and particularly to a drive train of a motorcycle or another automotive vehicle having an inner rotating element whose outer periphery includes a plurality of ramps with at least one centrifugal weight device surrounding the inner rotating element and including a plurality of peripherally distributed centrifugal weights and whose inner periphery includes a plurality of counter ramps for forming a positive and or frictional engagement with the ramps of the inner rotating element, and also including an outer rotating element surrounding the at least one centrifugal weight device, wherein the centrifugal weights of the centrifugal weight device for creating a frictional engagement with the outer rotating element can be pressed outwards through a friction lining against an inner periphery of the outer rotating element in opposition to the action of a spring arrangement.

Such centrifugal clutches are often used in drive trains of motor scooters. In this application, the centrifugal weights with the clutch linings are arranged in the centrifugal weight device, distributed over the periphery, and urged inwards through an arrangement of springs or other energy storage devices. Through the rotation of the inner rotating element a centrifugal force is generated with the result that the centrifugal weights come via the clutch linings into contact with the outer rotating element and drive the outer rotating element.

BACKGROUND

The document DE 10 2008 030 657 A1 shows a corresponding centrifugal clutch. This includes (i) a hub as inner rotating element, whose outer periphery includes a plurality of ramp-like contact surfaces, (ii) a centrifugal weight device surrounding the inner rotating element and comprising two peripherally distributed centrifugal weights and two tension springs and whose inner periphery includes a plurality of ramp-like counter surfaces for forming a positive engagement with the contact surfaces of the hub, and (iii) a belt pulley as an outer rotating element surrounding the at least one centrifugal weight device, wherein the centrifugal weights of the centrifugal weight device for creating a frictional engagement with the belt pulley can be pressed outwards through the centrifugal force against the inner periphery of the belt pulley in opposition to the action of the energy storage elements.

SUMMARY

The object of the disclosure is to provide a centrifugal clutch that has a particularly compact configuration in the axial direction.

The disclosure achieves the above object through the features of independent claim 1. Preferred embodiments of the disclosure are represented in sub-claims that may show, singularly or in a combination, a respective aspect of the disclosure.

In a centrifugal clutch according to the disclosure, the centrifugal weight device is generally formed by an annular plate structure including a single plate element or a stack comprised of a plurality of plate elements, wherein the plate structure includes a plurality of peripherally distributed peripheral sections that form the centrifugal weights. Under a sufficiently high speed of rotation (n) of the inner rotating element the centrifugal weights and with them the entire plate structure is pressed outwards in the radial direction. On the inner periphery of the plate structure are disposed the counter ramps on which—when the plate structure is in contact with the outer rotating element, so that an initial torque in a direction opposed to the direction of rotation is created—the individual ramps migrate upwards and thus initiate a self-intensifying effect of the clamping action.

A particular intention of the disclosure is to provide a centrifugal clutch configured in the manner of an overrunning clutch known under the designation "wedge blade clutch" or "wedge clutch". A description of this overrunning clutch is to be found for example in German publication WO 2014/011610 A1. Due to the "wedge clutch"-like construction, the centrifugal clutch of the disclosure has a clearly more compact structure in the axial direction. The occurring self-intensifying effect leads to a faster entrainment of the outer rotating element so that wear is kept at a low level.

According to a preferred configuration of the disclosure, the spring arrangements are formed out of the resiliently configured components of the at least one plate element and/or of at least one additional spring element. The spring arrangement can also be configured integrally with the plate structure, or may also include additional spring elements.

One particular feature is that one of the resiliently configured components of the plate structure is arranged between at least two of the peripheral sections of the plate structure that form the centrifugal weights. However, it is preferred to arrange a plurality of the resiliently configured components of the plate structure between the peripheral sections of the plate structure that form the centrifugal weights.

In a further preferred configuration of the disclosure the at least one additional spring element is arranged between the plate structure and the inner rotating element. The spring element is preferably configured as a tension spring.

In a preferred embodiment of the disclosure the centrifugal clutch is configured such that, at a speed of rotation n=0 of the plate structure, an annular gap is formed between the outer periphery of the plate structure and the inner periphery of the outer rotating element.

In principle the friction lining could be arranged on the outer periphery of the plate structure. It is preferable, however, to arrange the friction lining on the inner periphery of the outer rotating element.

According to a further preferred configuration of the disclosure, the at least one plate element is made in one piece. In this case, the at least one plate element made in one piece is made of a sufficiently elastic material.

According to a still further configuration of the disclosure, the friction lining is disposed on the inner periphery of the outer ring, and during rotation, the friction lining is in contact with the wedges.

According to a still further configuration of the disclosure, a complete removal of material is provided in one peripheral section arranged between two of the peripheral sections of the plate structure that form the centrifugal weights.

According to a preferred embodiment of the disclosure, the ramps and the counter ramps are formed respectively by a serrated type of peripheral structure. Such a configuration is known from the "wedge clutch" type of structure. This leads to the formation, respectively, of a first ramp with a first ascending gradient and a second ramp with an ascending gradient that, compared to the gradient of the first ramp, is extremely steeper. However this gradient has a different digit sign.

According to a further preferred embodiment of the disclosure, the ramps of the inner rotating element and the counter ramps of the plate structure are arranged rotationally symmetrically (actinomorphic) to each other. This kind of configuration is also known from the "wedge clutch" type of structure.

Finally, the disclosure advantageously provides that the inner rotating element is configured as an inner ring and the outer rotating element is configured as an outer ring.

BRIEF DESCRIPTION OF THE DRAWINGS

In the following, the disclosure will be described by way of example with reference to the appended drawings showing preferred examples of embodiment, it being understood that the features represented in the following can illustrate, each one for itself or in combination with others, a particular aspect of the disclosure. Coming now to the figures.

DETAILED DESCRIPTION

Figure 1:
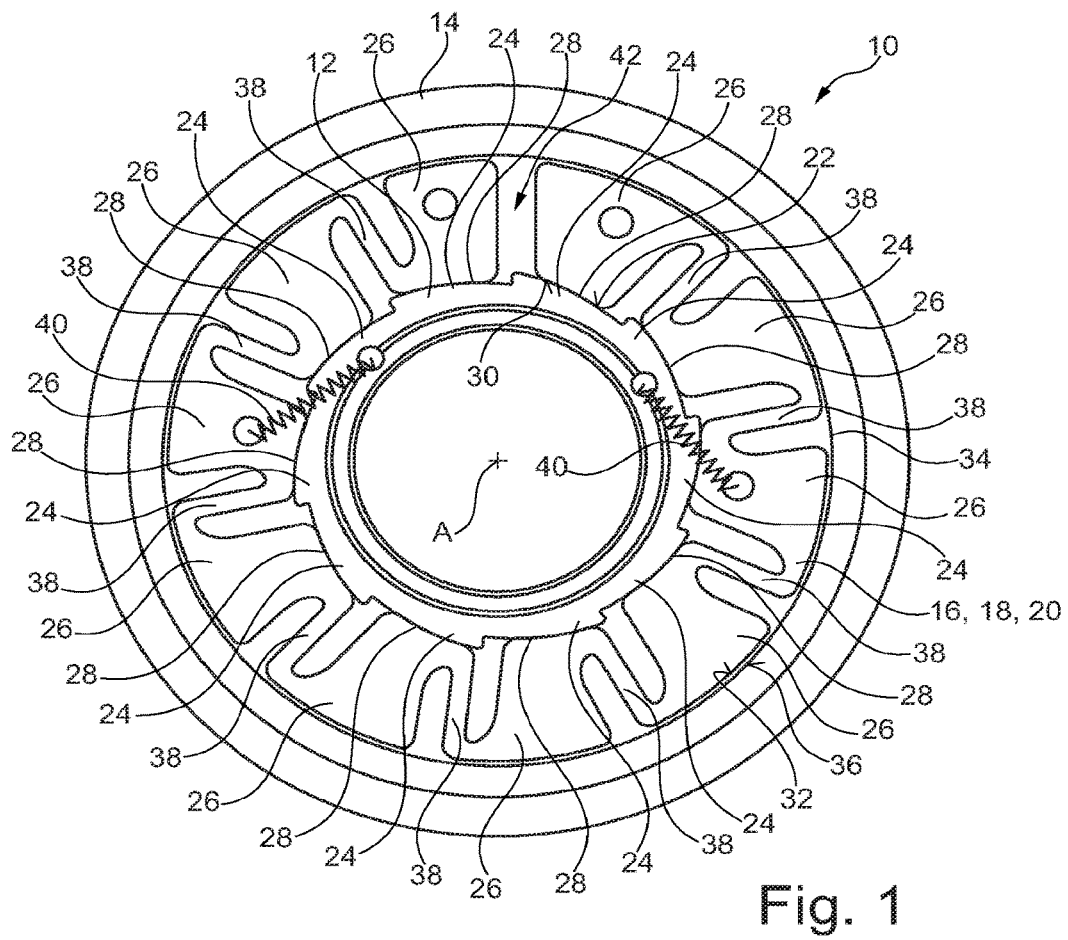
FIG. 1 shows a centrifugal clutch according to a preferred embodiment of the disclosure, in a side view.

FIG. 1 shows a centrifugal clutch 10 for a drive train (not shown) of a motorcycle or another automotive vehicle. Such a motorcycle is particularly a motor scooter. The centrifugal clutch 10 comprises three main components 12, 14, 16 arranged coaxially to an axis of rotation A. These components are: an inner rotating element 12 configured as an inner ring, an outer rotating element 14 configured as an outer ring and a centrifugal weight device 16 arranged radially between these two components 12, 14 and configured generally as an annular plate structure 20 comprising a single plate element 18. The plate element 18 is configured in one single piece. The outer periphery 22 of the inner rotating element 12 includes a plurality of ramps 24. The plate structure 18 that surrounds the inner rotating element 12 comprises a plurality of peripheral sections distributed along the periphery that form a corresponding number of centrifugal weights 26, each of the centrifugal weights 26 comprising on its radially inwards facing side a counter ramp 28 for forming a positive and/or frictional engagement with the ramps 24 of the inner rotating element 12. In other words, the thus formed inner periphery 30 of the plate structure 18 therefore forms a plurality of counter ramps 28 to the ramps 24. In the shown example, there are ten centrifugal weights 26 and also ten ramps 24 and counter ramps 28, respectively.

On an inner periphery 32, the outer rotating element 14 comprises a friction lining 34, the centrifugal clutch 10 being configured such that, at a speed of rotation n=0 of the plate structure 20, an annular gap (S) is formed between the outer periphery 36 of the plate structure 20 and said inner periphery 32 of the outer rotating element 14.

For creating a frictional engagement with the outer rotating element 14 through its friction lining 34, the centrifugal weights of the plate structure 20 can be pressed against an inner periphery 32 of the outer rotating element 14, in opposition to the action of a spring arrangement formed by resiliently configured components 38 of the plate structure 20 and by an additional spring element 40. Each of the resiliently configured components 38 of the plate structure 20 is configured in form of a web arranged respectively between two of the peripheral sections of the plate structure 20 that form the centrifugal weights 26. An aperture 42, that is to say a gap in the annular shape, made by a complete removal of material is provided in one peripheral section arranged between two of the peripheral sections of the plate structure 20 that form the centrifugal weights 26.

The ramps 24 are formed by a serrated type of peripheral structure of the inner rotating element 12, and the counter ramps 28 are formed by a corresponding serrated type of peripheral structure of the plate structure 20. This leads to the formation respectively of a ramp structure with a first ascending gradient and a further ramp structure with an almost radial orientation (serrated type). The ramps 24 of the inner rotating element and the counter ramps 28 of the plate structure 20 are arranged rotationally symmetrically (actinomorphic). The number of the peripheral sections provided defines the "number of positions" of the rotational symmetry, i.e. a ten-fold geometry in the present example.

Alternatively to the configuration in which the annular plate structure 20 generally comprises a single plate element 18, it is also possible for the plate structure 20 to comprise a stack made up of a plurality of plate elements 18 (not shown).

From all this, the following mode of functioning of the centrifugal clutch 10 results:

In presence of a sufficiently high speed of rotation (n) of the inner rotating element 12 the centrifugal weights 26 and with them, the entire plate structure 20 is pressed radially outwards. On the inner periphery 30 of the plate structure 20 are disposed the counter ramps 28 on which—when the plate structure 20 is in contact with the outer rotating element 14, so that an initial torque in a direction opposed to the direction of rotation is created—the individual ramps migrate upwards and thus initiate a self-intensifying clamping effect. Following this, the entrainment of the outer rotating element 14 takes place due to the clamping effect of the plate structure 20 between the inner and the outer rotating elements 12, 14 controlled by the frictional forces. The relevant speed of rotation at which a first contact with the outer ring takes place is controlled and determined by the spring rigidity of the spring arrangement of the resiliently configured components 38 of the at least one plate element 18 and/or of the additional spring elements 40.

This type of construction of the centrifugal clutch 10 leads to the following advantages:

a compact construction compared to conventional centrifugal clutches, less wear due to adjustable self-intensifying effect and a mode of construction without an additional spring element 42 is enabled. The entrainment speed of rotation is determined by the rigidity of the plate structure 20 in itself.

Figure 2:
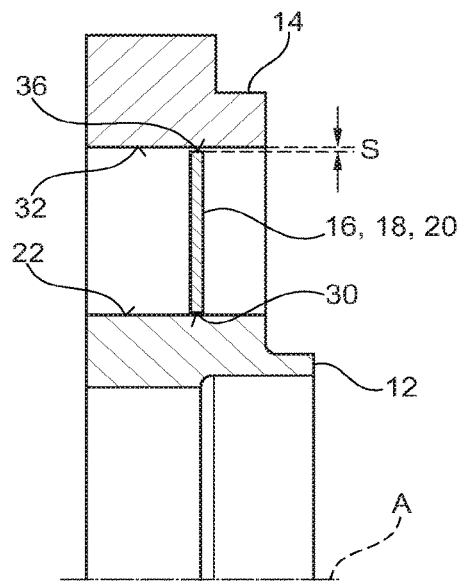
FIG. 2 shows the upper half of the centrifugal clutch of FIG. 1 in a cross-sectional representation along the axis of rotation.

FIG. 2 shows the upper half of the centrifugal clutch 10 shown in FIG. 1 (at a speed of rotation n=0) in a cross-sectional representation. It can be clearly seen in this representation, on the one hand, that the plate structure 20 in the shown example of embodiment is made up of only one plate element 18, and on the other hand the annular gap S between the inner periphery of the outer rotating element 14 and the outer periphery of the plate structure 20 is also clearly visible. In addition, the configuration of the inner rotating element 12 as an inner ring (or in form of a hub, as the case may be) and the configuration of the outer rotating element 14 as an outer ring are also clearly recognizable.

Figure 3:
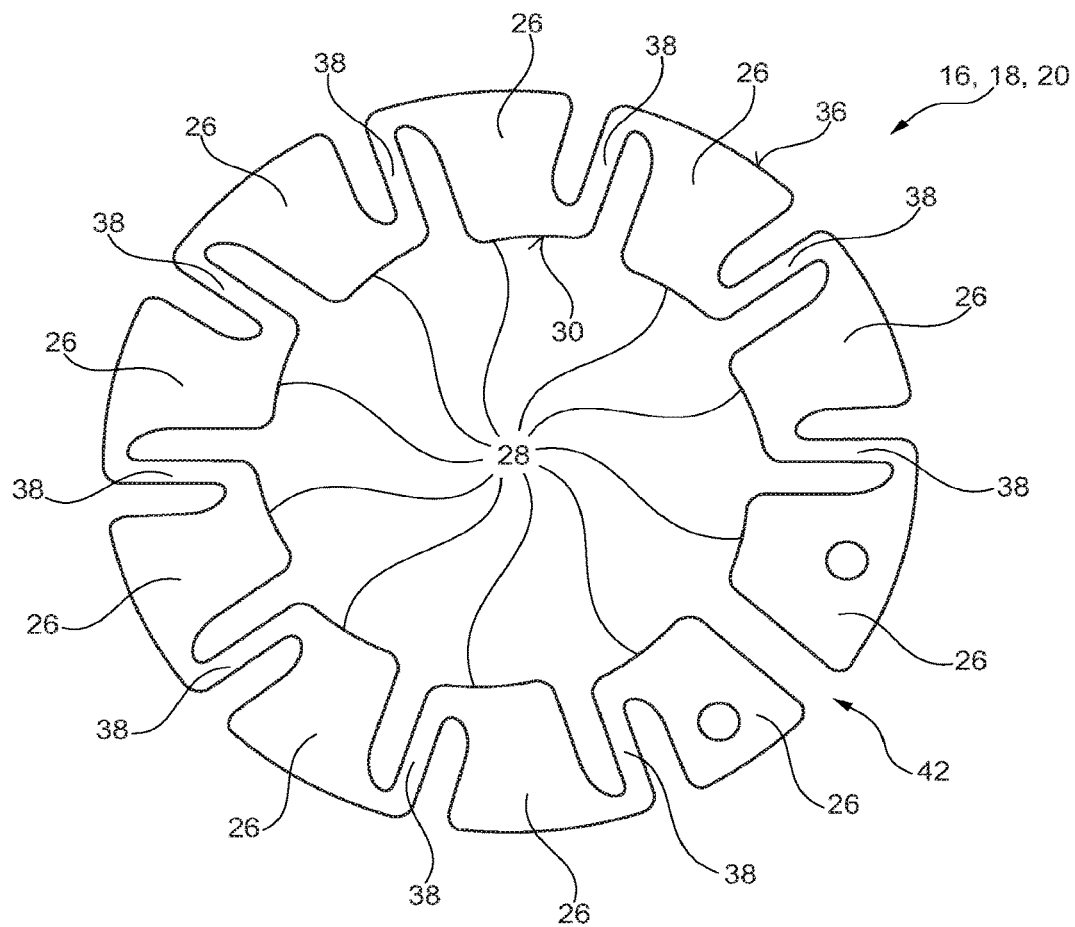
FIG. 3 shows a generally annular plate structure that forms a centrifugal weight device of the centrifugal clutch.

FIG. 3 shows once again in detail the annular plate structure 20 that forms the centrifugal weight device 16 of the centrifugal clutch 10. In this figure, the ten peripherally distributed centrifugal weights 26, the resiliently configured components 38 arranged between these weights and also the material removal (gap) in one peripheral section are clearly recognizable. Furthermore, the one-piece structural embodiment of the plate element 18 is also visible. Despite the aperture 42, the plate element 18 and the plate structure 20 resulting therefrom are generally of an annular shape.

LIST OF REFERENCE NUMERALS

10 Centrifugal clutch
12 Rotating element, inner
14 Rotating element, outer
16 Centrifugal weight device
18 Plate element
20 Plate structure
22 Outer periphery (inner rotating element)
24 Ramp
26 Centrifugal weight
28 Counter ramp
30 Inner periphery (plate structure)
32 Inner periphery (outer rotating element)
34 Friction lining
36 Outer periphery (plate structure)
38 Component, resilient
40 Spring element (additional)
42 Material removal (aperture)
A Axis of rotation
S Annular gap

The invention claimed is:

1. A centrifugal clutch for a drive train of an automotive vehicle, comprising:
   an inner rotating element whose outer periphery includes a plurality of ramps;
   at least one centrifugal weight device surrounding the inner rotating element and including a plurality of peripherally distributed centrifugal weights separated by resilient components and whose inner periphery includes a plurality of counter ramps for forming a positive and/or frictional engagement with the ramps of the inner rotating element;
   an outer rotating element surrounding the at least one centrifugal weight device;
   a tension spring element, separate from the at least one centrifugal weight device, arranged between the inner rotating element and the at least one centrifugal weight device; and,
   a friction lining on an inner periphery of the outer rotating element, wherein:
      the centrifugal weights of the centrifugal weight device are configured to be pressed outwards against the friction lining in opposition to the action of the resilient components and the tension spring element to create a frictional engagement with the outer rotating element; and,
      the centrifugal weight device generally being formed by an annular plate structure including at least one plate element, wherein the annular plate structure includes a plurality of peripherally distributed peripheral sections that form the centrifugal weights.

2. The centrifugal clutch according to claim 1, wherein each of the resilient components is in the form of a web arranged respectively between two of the peripheral sections of the at least one plate element.

3. The centrifugal clutch according to claim 1, wherein the centrifugal clutch is configured such that, at a speed of rotation n=0 of the annular plate structure, an annular gap is formed between an outer periphery of the annular plate structure and the friction lining.

4. The centrifugal clutch according to claim 1, wherein the at least one plate element is configured in one piece.

5. The centrifugal clutch according to claim 1, wherein a complete removal of material is provided in one peripheral section arranged between two of the peripheral sections of the annular plate structure that form the centrifugal weights.

6. The centrifugal clutch according to claim 1, wherein the ramps and the counter ramps are formed respectively by a serrated type of peripheral structure.

7. The centrifugal clutch according to claim 1, wherein the ramps of the inner rotating element and the counter ramps of the annular plate structure are arranged rotationally symmetrically to each other.

8. A centrifugal clutch for a drive train of an automotive vehicle, comprising:
   an inner rotating element having an outer periphery including a first plurality of ramps each having an ascending gradient;
   at least one centrifugal weight device surrounding the inner rotating element, the centrifugal weight device generally being formed by an annular plate structure including a plate element, wherein the annular plate structure includes:
   a plurality of peripherally distributed peripheral sections that form the centrifugal weights, each of the peripheral sections comprising a counter ramp configured to form a positive or frictional engagement with a one of the first plurality of ramps; and,
   a plurality of resiliently configured components each configured in the form of a radially extending web arranged respectively between two of the peripheral sections to form at least a portion of a spring arrangement having a spring rigidity;
   an outer rotating element surrounding the at least one centrifugal weight device and including an inner periphery having a friction lining thereon, wherein:
   at a speed of rotation n=0 of the annular plate structure, an annular gap is formed between an outer periphery of the annular plate structure and the inner periphery of the outer rotating element; and,
   at a certain speed of rotation of the annular plate structure determined by the spring rigidity of the spring arrangement, the centrifugal weights of the centrifugal weight device are configured to be pressed outwards to contact the friction lining of the outer rotating element in opposition to the action of a spring arrangement to create a frictional engagement with the outer rotating element and the counter ramps are configured to migrate outwards and initiate a self-intensifying clamping effect
   wherein the spring arrangement comprises at least one additional tension spring element.

9. The centrifugal clutch according to claim 8, wherein the at least one additional spring element is arranged between the annular plate structure and the inner rotating element.

10. The centrifugal clutch according to claim 8, wherein the at least one plate element is configured in one piece.

11. The centrifugal clutch according to claim 8, wherein the at least one plate element is configured as a stack comprised of a plurality of plate elements.

12. The centrifugal clutch according to claim 8, wherein a gap is defined in the annular plate structure between two of the peripheral sections of the annular plate structure that form the centrifugal weights.

13. The centrifugal clutch according to claim 8, wherein the ramps and the counter ramps are formed respectively by a serrated type of peripheral structure.

14. The centrifugal clutch according to claim 8, wherein the ramps of the inner rotating element and the counter ramps of the annular plate structure are arranged rotationally symmetric to each other.

\* \* \* \* \*